United States Patent
Miyamoto et al.

(10) Patent No.: US 8,225,058 B2
(45) Date of Patent: Jul. 17, 2012

(54) MEMORY SYSTEM MANAGING A SIZE OF LOGS

(75) Inventors: Hironobu Miyamoto, Kanagawa (JP); Hajime Yamazaki, Saitama (JP); Shinji Yonezawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 300 days.

(21) Appl. No.: 12/559,983

(22) Filed: Sep. 15, 2009

(65) Prior Publication Data

US 2010/0205353 A1 Aug. 12, 2010

(30) Foreign Application Priority Data

Feb. 12, 2009 (JP) ................................. 2009-030297

(51) Int. Cl.
*G06F 12/00* (2006.01)

(52) U.S. Cl. ................ 711/162; 711/156; 711/E12.002; 711/E12.008

(58) Field of Classification Search .................. 711/161, 711/162, 165, 202, 203, 112, 113, 114, E12.001, 711/E12.002, E12.008
See application file for complete search history.

(56) References Cited

U.S. PATENT DOCUMENTS

| 7,016,226 | B2 | 3/2006 | Shibata et al. | |
|---|---|---|---|---|
| 2005/0097288 | A1* | 5/2005 | Holzmann | 711/162 |
| 2006/0224636 | A1 | 10/2006 | Kathuria et al. | |
| 2006/0236053 | A1* | 10/2006 | Shiga et al. | 711/163 |
| 2009/0222636 | A1 | 9/2009 | Yano et al. | |
| 2010/0169551 | A1* | 7/2010 | Yano et al. | 711/103 |
| 2010/0205353 | A1* | 8/2010 | Miyamoto et al. | 711/103 |

FOREIGN PATENT DOCUMENTS

JP 2004-192789 7/2004

OTHER PUBLICATIONS

U.S. Appl. No. 12/530,467, filed Sep. 9, 2009, Junji Yano, et al.
U.S. Appl. No. 12/529,145, filed Aug. 28, 2009, Junji Yano, et al.
U.S. Appl. No. 12/529,223, filed Aug. 31, 2009, Junji Yano, et al.
U.S. Appl. No. 12/529,227, filed Aug. 31, 2009, Junji Yano, et al.
U.S. Appl. No. 13/063,255, filed Mar. 10, 2011, Yano, et al.
U.S. Appl. No. 13/326,872, filed Dec. 15, 2011, Hirao, et al.

* cited by examiner

*Primary Examiner* — Pierre-Michel Bataille
(74) *Attorney, Agent, or Firm* — Oblon, Spivak, McClelland, Maier & Neustadt, L.L.P.

(57) ABSTRACT

A memory system according to an embodiment of the present invention includes: a log overflow control unit configured, when a predetermined condition is satisfied, to prohibit a recording operation of a log and to cause a log recording unit only to perform an updating operation of a management table, and when a commit condition is satisfied after the predetermined condition has been satisfied, to prohibit a commit operation by a log reflecting unit and to cause a snapshot storing unit to perform a snapshot storing operation.

26 Claims, 8 Drawing Sheets

MEMORY SYSTEM MANAGING A SIZE OF LOGS

CROSS-REFERENCE TO RELATED APPLICATIONS

This application is based upon and claims the benefit of priority from the prior Japanese Patent Application No. 2009-30297, filed on Feb. 12, 2009; the entire contents of which are incorporated herein by reference.

BACKGROUND OF THE INVENTION

1. Field of the Invention

The present invention relates to a memory system that includes a nonvolatile semiconductor memory.

2. Description of the Related Art

Some personal computers (PC) employ a hard disk device as a secondary storage device. In such PCs, a technology is known for backing up data that has been stored in the hard disk device to prevent the data from becoming invalid because of some failure. For example, when act of changing data in the hard disk device is detected, a snapshot as a backup copy of the data before the change is taken and a log of changes made to the data is generated. Then, processing for taking a new snapshot, invalidating a log taken in the past before the new snapshot was taken, and generating a new log is repeated at every predetermined time, which is disclosed, for example, in US Patent Application Publication No. 2006/0224636. In case data becomes invalid due to some reason, the data can be restored by referring to the snapshot and the log.

BRIEF SUMMARY OF THE INVENTION

A memory system according to an embodiment of the present invention comprises: a memory system comprising: a volatile first storing unit; a nonvolatile second storing unit; and a controller that performs data transfer between a host apparatus and the second storing unit via the first storing unit, wherein the second storing unit stores therein a first management table and a second management table for managing data in the second storing unit, and the controller includes a snapshot transferring unit that loads the first management table and the second management table stored in the second storing unit onto the first storing unit as a master table at a time of start-up, a log recording unit that, when an event occurs so that the first management table in the master table needs to be updated, accumulates therein update information of the first management table in a log storage area of the first storing unit as a first log, and that, when an event occurs so that the second management table in the master table needs to be updated, accumulates therein update information of the second management table in the log storage area of the first storing unit as a second log and updates the second management table in the master table, a log reflecting unit that, when a first condition is satisfied, performs a commit operation of storing the first log and the second log accumulated in the log storage area in the second storing unit and reflecting a content of the first log in the first management table in the master table, a snapshot storing unit that, when a second condition, which is different from the first condition, is satisfied, stores the first management table and the second management table in the master table in the second storing unit as a snapshot, and a log overflow control unit that, when a third condition in which the second log accumulated in the log storage area exceeds a set value is satisfied, stops a recording operation of the second log in the log storage area by the log recording unit and causes the log recording unit to perform an update operation of the second management table in the master table and a recording operation of the first log in the log storage area, and that, when the first condition is satisfied next time, prohibits the commit operation by the log reflecting unit and causes the snapshot storing unit to perform a snapshot storing operation, the third condition being different from the first condition and the second condition.

DETAILED DESCRIPTION OF THE INVENTION

Figure 1:
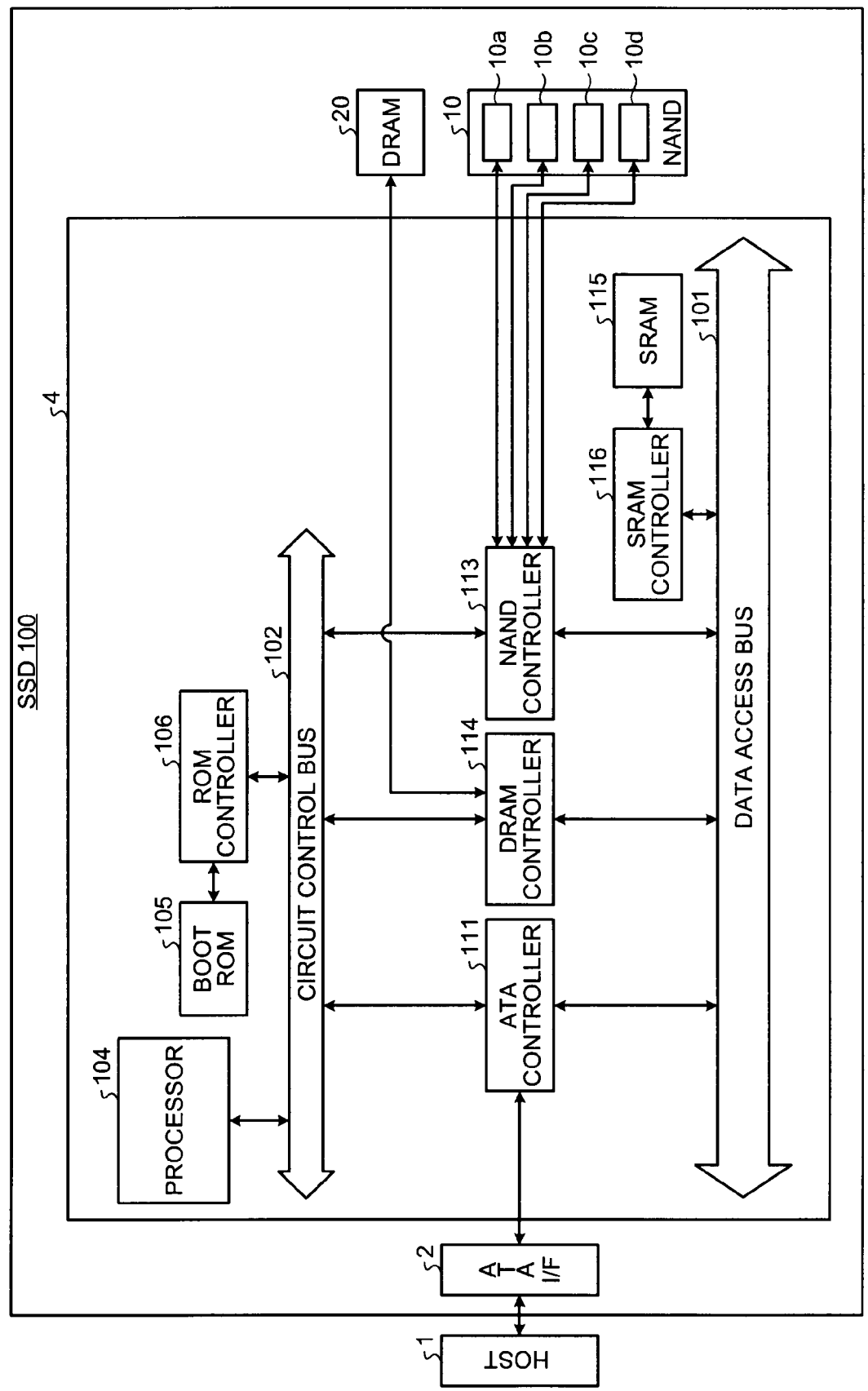
FIG. 1 is a block diagram of a configuration example of an SSD according to a first embodiment of the present invention.

In recent years, a capacity of a NAND-type flash memory as a nonvolatile semiconductor storage device has been increased dramatically. As a result, a Solid State Drive (SSD) as a memory system mounted with a NAND-type flash memory attracts attention. The flash memory has advantages such as high speed and lightweight compared with a magnetic disk device. However, the technology disclosed in U.S. Patent Application Publication No. 2006/0224636 cannot be applied to backup of data stored in such PC having the NAND-type flash memory as the secondary storage device as in the case of backup of data stored in the PC having the hard disk device as the secondary storage device. This is because a multi-value memory technology (multi-level cell (MLC)) that can store a plurality of pieces of data (multi-value data) equal to or larger than 2 bits in one memory cell is employed to increase the capacity of the NAND-type flash memory, which is disclosed, for example, in Japanese Patent Application Laid-open No. 2004-192789.

A memory cell configuring a multi-value memory has a field effect transistor structure having a stacked gate structure in which a gate insulating film, a floating gate electrode, an inter-gate insulating film, and a control gate electrode are stacked in order on a channel region and a plurality of threshold voltages can be set according to the number of electrons accumulated in the floating gate electrode. In order to make it possible to perform multi-value storage based on the plurality of threshold voltages, the distribution of a threshold voltage corresponding to one piece of data needs to be made extremely narrow.

The data recorded by the host apparatus such as the PC has both temporal locality and spatial locality. Therefore, when data is recorded, if the data is directly recorded in an address designated from the outside, rewriting, i.e., erasing processing temporally concentrates in a specific area and a bias in the number of times of erasing increases. Therefore, in the NAND-type flash memory, processing called wear leveling for equally distributing data update sections is performed. In the wear leveling processing, for example, a logical address designated by the host apparatus is translated into a physical address of the nonvolatile semiconductor memory so that the data update sections are equally distributed.

In such address translation, a storing position of data is often managed by using a management table such as an address translation table representing a correspondence relationship between a logical address (LBA) supplied from outside and a physical address (NAND address) indicating a position at which data is stored on a NAND-type flash memory. The management table is loaded from a nonvolatile NAND-type flash memory onto a memory such as a dynamic random access memory (DRAM) at the time of start-up, which is updated every time data is written. The management table loaded on the DRAM needs to be backed up by using a backup technology such as a snapshot and a log to be used over a power-turn-off.

Thereafter, normally, a management table that is loaded from a nonvolatile NAND-type flash memory at the time of start-up and a log indicating changes of the management table are stored on a volatile DRAM, the management table is updated and the log is accumulated along with data writing in the NAND-type flash memory, and the management table and the log on the DRAM are backed up in the nonvolatile NAND-type flash memory at an appropriate timing.

However, in recent years, with the improvement of the performance of an SSD, data write amount to a NAND-type flash memory in certain process units increases, and therefore an amount of update of the management table increases by that amount and a log to be accumulated is increased. Typically, a DRAM is often used also as a cache memory of a NAND-type flash memory, so that a countermeasure to decrease the size of a management table and reduce an amount of log to be accumulated in a DRAM has been required. Particularly, a log on a DRAM is accumulated in accordance with an event occurred. Therefore, depending on an event occurred, an upper limit of an amount of log to be accumulated for the event cannot be estimated, so that it is difficult to set an appropriate log set capacity (upper set value of a log accumulation amount) on a DRAM. Thus, when an amount of log to be accumulated exceeds a log capacity on the DRAM, it is difficult to exclude a possibility of causing a failure such as damaging data in an area other than a log area on a DRAM.

Exemplary embodiments of a memory system according to the present invention are described in detail below with reference to the accompanying drawings. The present invention is not limited to the embodiments.

(First Embodiment)

FIG. 1 is a block diagram of a configuration example of an SSD 100 according to a first embodiment of the present invention. The SSD 100 includes a drive control circuit 4 as a controller, a NAND-type flash memory (hereinafter, NAND memory) 10 as a nonvolatile semiconductor memory, a DRAM 20 as a volatile semiconductor memory, and a memory connection interface such as an advanced technology attachment interface (ATA I/F) 2. The SSD 100 is connected to a host apparatus 1 (hereinafter, host 1) such as a PC or a central processing unit (CPU) core via the ATA I/F 2 and functions as an external storage of the host 1.

The NAND memory 10 stores therein user data specified by the host 1, management information managed in the DRAM 20 for backup, and performs other processing. The NAND memory 10 has a memory cell array in which a plurality of memory cells is arrayed in a matrix manner, and each memory cell can perform multi-value storage by using an upper page and a lower page. The NAND memory 10 includes a plurality of NAND memory chips, each of which is configured by arraying a plurality of physical blocks. A physical block is a unit of data erasing. In the NAND memory 10, data writing and data reading is performed for each physical page. A physical block includes a plurality of physical pages. In the present embodiment, in the NAND memory 10, four parallel operation elements 10a to 10d are connected in parallel to a NAND controller 113 in the drive control circuit 4 via four channels (4 ch) each for a plurality of bits, so that the four parallel operation elements 10a to 10d can be actuated in parallel.

The DRAM 20 is used as a storing unit for data transfer, management information recording, or a work area. Specifically, as the storing unit (cache) for data transfer, the DRAM 20 is used to temporarily store therein data for which writing is requested from the host 1 before writing the data in the NAND memory 10 or to read out from the NAND memory 10 data for which readout is requested from the host 1 and temporarily store the data therein. As the storing unit for management information recording, the DRAM 20 is used to store therein management information for managing a storing position of data stored in the NAND memory 10. The management information includes a master table that is obtained by loading various management tables stored in the NAND memory 10 at the time of start-up or the like, a difference log that is a copy of a change difference of a management table, and an event log that records occurrence of an event. Furthermore, as the storing unit for a work area, the DRAM 20 is used when loading a log that is used in restoring management information or the like.

The drive control circuit 4 performs data transfer control between the host 1 and the NAND memory 10 via the DRAM 20 and controls the respective components in the SSD 100.

The drive control circuit 4 includes a data access bus 101 and a circuit control bus 102. A processor 104 that controls the entire drive control circuit 4 is connected to the circuit control bus 102. A boot read only memory (ROM) 105, in which a boot program for booting respective management programs (FW: firmware) stored in the NAND memory 10 is stored, is connected to the circuit control bus 102 via a ROM controller 106.

An ATA interface controller (hereinafter, ATA controller) 111, the NAND controller 113, and a DRAM controller 114 are connected to both the data access bus 101 and the circuit control bus 102. The ATA controller 111 transmits data to and receives data from the host 1 via the ATA interface 2. A static random access memory (SRAM) 115 used as a data work area and a firmware expansion area is connected to the data access bus 101 via an SRAM controller 116. When the firmware stored in the NAND memory 10 is started, the firmware is transferred to the SRAM 115 by the boot program stored in the boot ROM 105.

The DRAM controller 114 performs interface processing for interface with the processor 104 and the DRAM 20 and other processing. The NAND controller 113 performs interface processing for interface with the processor 104 and the NAND memory 10, data transfer control between the NAND memory 10 and the DRAM 20, encode and decode processing of an error correction code, and other processing.

Figure 2:
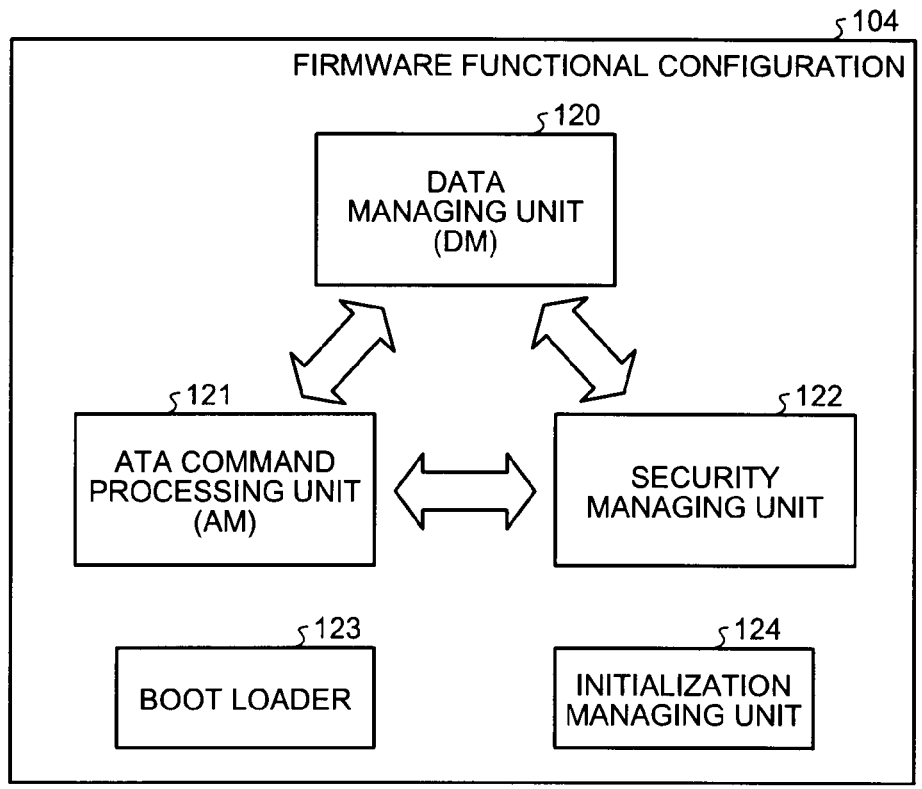
FIG. 2 is a block diagram of a functional configuration example of a processor shown in FIG. 1.

FIG. 2 is a block diagram of a functional configuration example of a firmware realized by the processor 104. Functions of the firmware realized by the processor 104 are roughly classified into a data managing unit (DM: data manager) 120, an ATA-command processing unit (AM: ATA manager) 121, a security managing unit 122, a boot loader 123, an initialization managing unit 124, and the like.

The data managing unit 120 controls data transfer between the NAND memory 10 and the DRAM 20 and various functions concerning the NAND memory 10 via the NAND controller 113, the DRAM controller 114, and the like. The ATA-command processing unit 121 performs data transfer processing between the DRAM 20 and the host 1 in cooperation with the data managing unit 120 via the ATA controller 111 and the DRAM controller 114. The security managing unit 122 manages various kinds of security information in cooperation with the data managing unit 120 and the ATA-command processing unit 121.

The boot loader 123 loads, when a power supply is turned on, the management programs (firmware) from the NAND memory 10 onto the SRAM 115. The initialization managing unit 124 performs initialization of respective controllers and circuits in the drive control circuit 4.

Next, the data managing unit 120 is explained in detail. The data managing unit 120 performs, for example, provision of functions that the ATA-command processing unit 121 requests the NAND memory 10 and the DRAM 20 as storage devices (in response to various commands such as a Write request, a Cache Flush request, and a Read request from the host 1), management of a correspondence relation between a logical address given from the host 1 and a physical address of the NAND memory 10, protection of management information by a snapshot and a log, provision of fast and highly efficient data reading and writing functions using the DRAM 20 and the NAND memory 10, and ensuring of reliability of the NAND memory 10.

Figure 3:
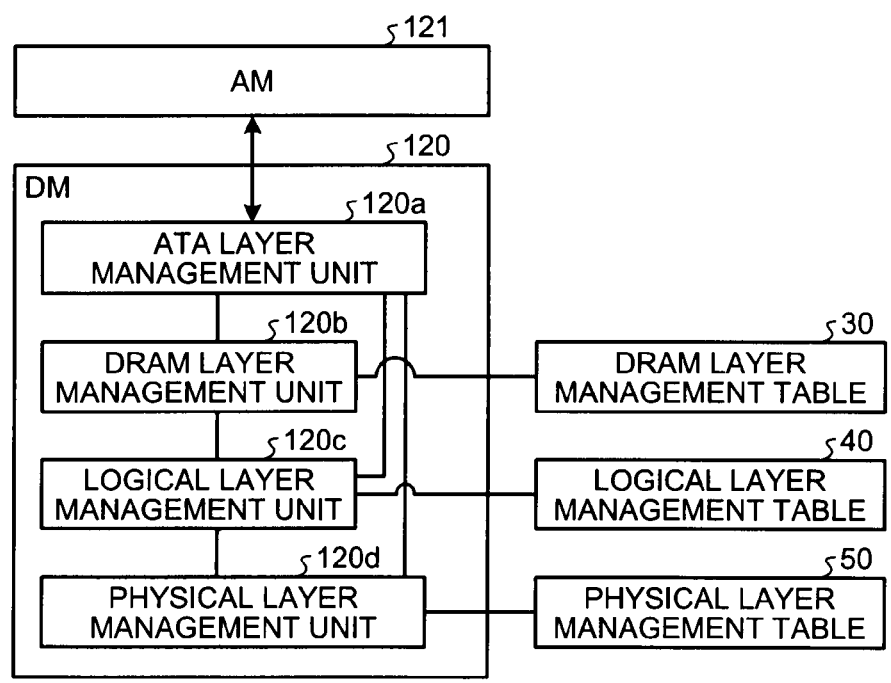
FIG. 3 is a block diagram of a functional configuration of a data managing unit shown in FIG. 2.

The data managing unit 120 employs a multilayered management structure as shown in FIG. 3, and includes an ATA layer managing unit 120a, a DRAM layer managing unit 120b, a logical layer managing unit 120c, and a physical layer managing unit 120d in order from the upper layer.

The ATA layer managing unit 120a receives a request from the ATA-command processing unit 121 and responds to the request and notifies an appropriate managing unit in the lower layer of the request. The DRAM layer managing unit 120b manages data on the DRAM 20 by using a DRAM layer management table 30.

When the host 1 issues a Read request or a Write request to the SSD 100, the host 1 inputs logical block addressing (LBA) as a logical address and a data size via the ATA I/F 2. LBA is a logical address in which serial numbers from zero are attached to sectors (size: 512 B). A logical block is a virtual block associated with a plurality of physical blocks on a chip of the NAND memory 10. In the present embodiment, a logical block is associated with physical blocks for the number of parallel channels (in this case, four channels as shown in FIG. 1). In the similar manner, a logical page is associated with physical pages for four channels.

The logical layer managing unit 120c manages data on the NAND memory 10 by using various logical layer management tables 40, and performs management of a correspondence relation between LBA and a logical block, data writing control from the DRAM 20 to the NAND memory 10, data reading control from the NAND memory 10 to the DRAM 20, organizing of user data in the NAND memory 10, and the like.

The physical layer managing unit 120d manages the NAND memory 10 by using various physical layer management tables 50, and performs provision of a logical block, management of nonvolatile information, control of the NAND controller 113, and the like. Specifically, the physical layer managing unit 120d performs management of a free block, a bad block, and an active block, management of a correspondence relation between a logical block and a physical block, management of a physical error, execution of wear leveling and refresh, management of nonvolatile information (snapshot and log), control of the NAND controller 113, and the like.

A free block (FB) is a logical block which does not include valid data therein and for which a use is not allocated. An active block (AB) is a logical block for which a use is allocated. A bad block (BB) is a physical block that cannot be used as a storage area because of a large number of errors. For example, a physical block for which the erasing operation is not normally finished is registered as the bad block BB.

With the management information managed by each of the management tables 30, 40, and 50 shown in FIG. 3, LBA used in the host 1, a logical NAND address (logical block address, or the like) used in the SSD 100, and a physical NAND address (physical block address, or the like) used in the NAND memory 10 can be associated with each other, so that data exchange between the host 1 and the NAND memory 10 can be performed.

Figure 4:
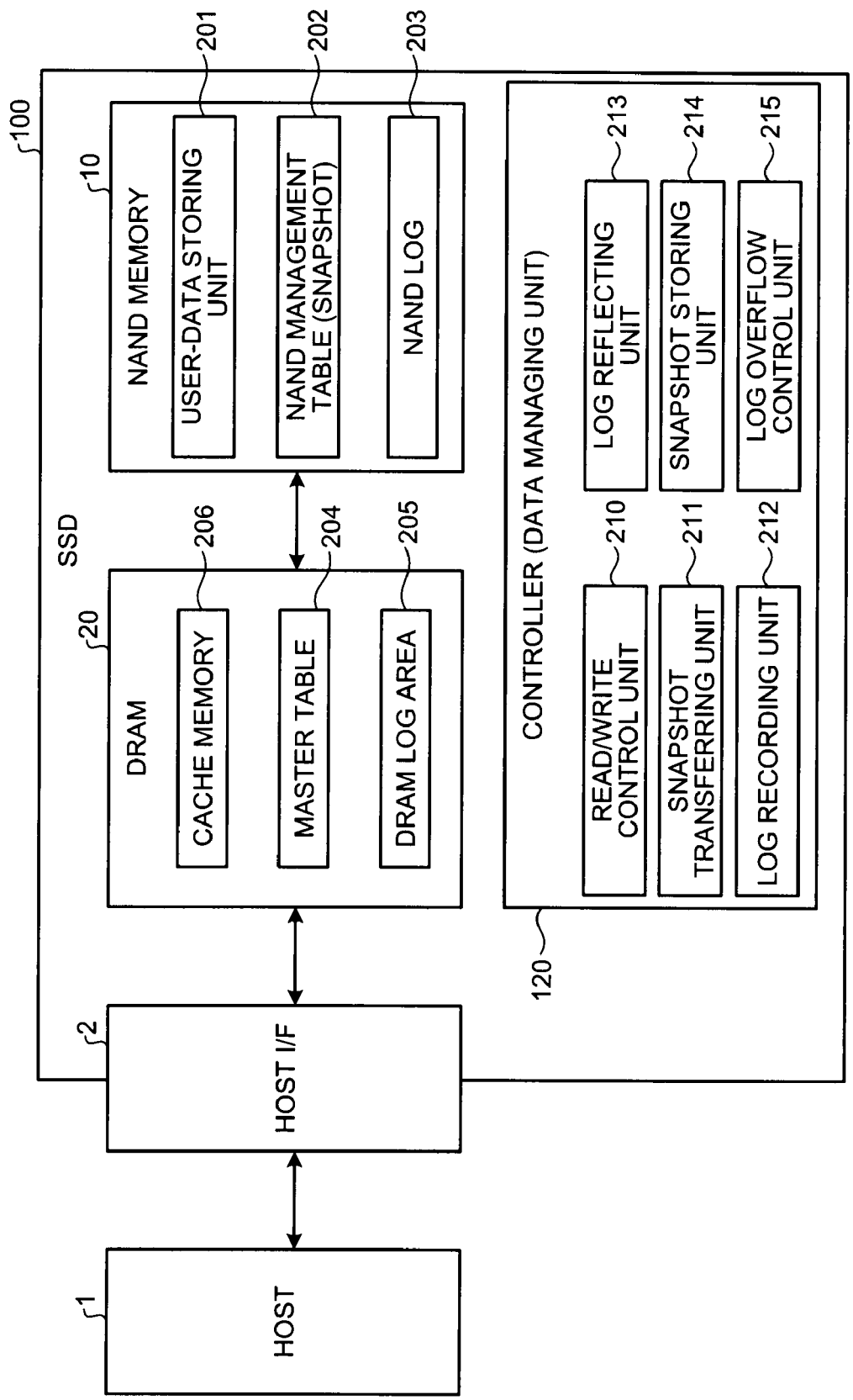
FIG. 4 is a functional block diagram illustrating a relevant portion according to the first embodiment of the present invention.

FIG. 4 is a functional block diagram illustrating a relevant portion according to the present embodiment of the present invention. The NAND memory 10 stores therein a user-data storing unit 201 that stores therein user data, a NAND management table 202 (including the logical layer management table 40, and the physical layer management table 50) that is stored in a predetermined storage area on the NAND memory 10 and manages the NAND memory 10 among various management tables shown in FIG. 3, and a log (hereinafter, "NAND log") 203 that is stored in a predetermined storage area on the NAND memory 10 in the similar manner to the NAND management table 202 as change difference information of the NAND management table 202.

In the DRAM 20, a master table 204 that is the NAND management table 202 loaded on the DRAM 20 and a DRAM log area 205 as a log buffer area on the DRAM 20 for accumulating and storing changes made to the master table 204 are prepared, in addition to a cache memory 206.

The NAND management table 202 stored in a predetermined area of the NAND memory 10 is loaded onto the volatile DRAM 20 at the time of start-up, which is the master table 204. The master table 204 is updated by the data managing unit 120 using it. Even when the power is turned off, the master table 204 needs to be restored to a state before the power is turned off, so that a system of storing the master table 204 in the nonvolatile NAND memory 10 is needed. The nonvolatile NAND management table 202 on the NAND memory 10 is called also as a snapshot. An operation of storing the master table 204 used on the DRAM 20 directly in the NAND memory 10 is expressed also as "take a snapshot".

A log indicates change difference information of the master table 204. If a snapshot is taken for every update of the master table 204, a processing speed becomes slow and the number of times of writing in the NAND memory 10 increases, so that only a log as change difference information accumulated in the DRAM log area 205 is normally accumulated and recorded in the NAND memory 10. An operation of reflecting a log in the master table 204 and storing it in the NAND memory 10 is expressed also as "commit". A log stored in the NAND memory 10 through the commit processing is the NAND log 203.

Figure 5:
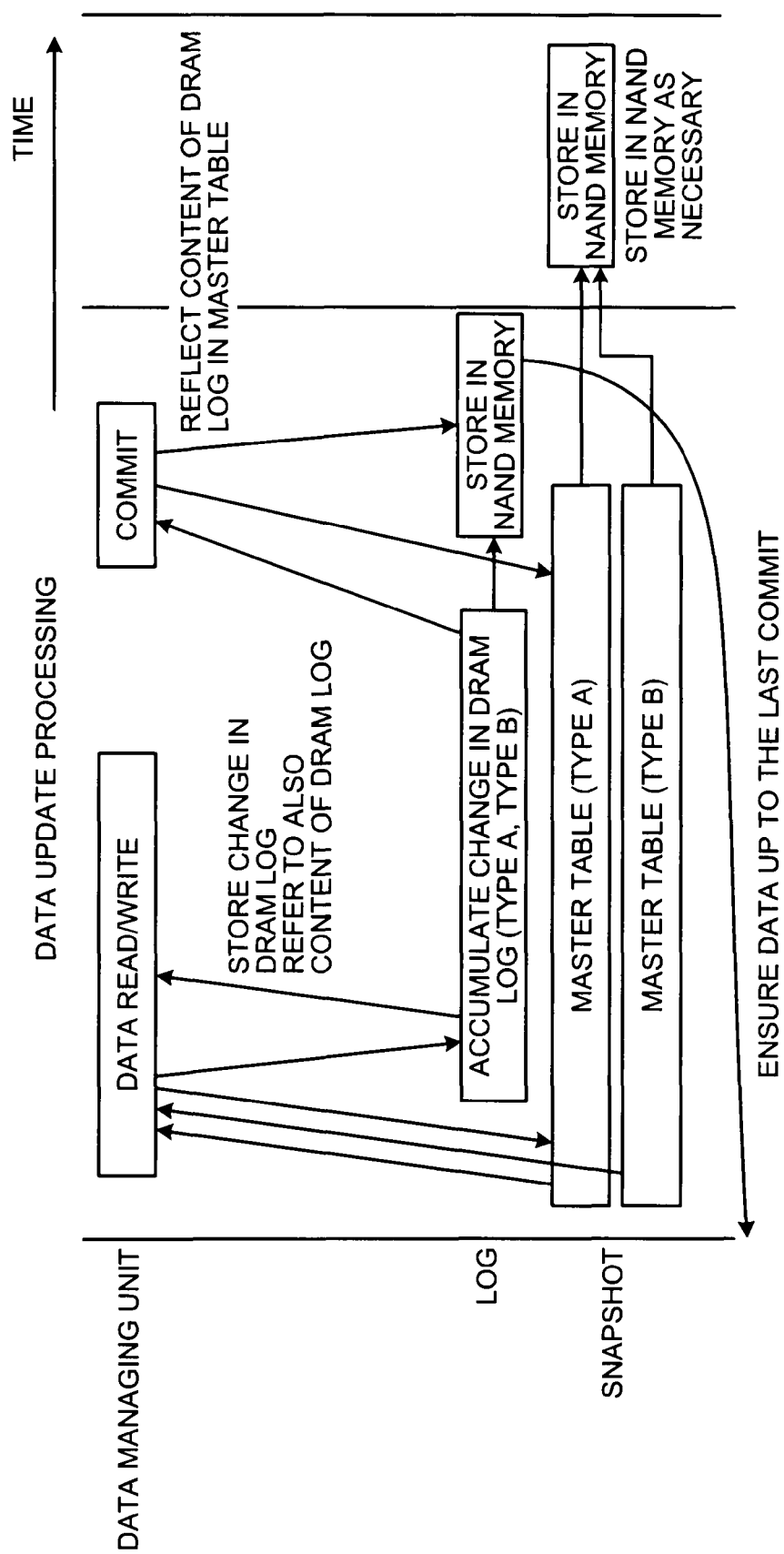
FIG. 5 is a schematic diagram of a generation state of a snapshot and a log.

FIG. 5 is a schematic diagram illustrating an updating state of a snapshot and a log at the time of data update. When the data managing unit 120 updates data, a log as difference information of changes made to the master table 204 is accumulated in the DRAM log area 205. The management information managed by the data managing unit 120 has two types of a type A and a type B. In the type A, only accumulation of a log (difference information) in the DRAM log area 205 is performed and the master table 204 is not updated in data update. In the type B, accumulation of a log (difference information) in the DRAM log area 205 is performed and the master table 204 is updated in data update. In data read/write processing, a log accumulated in the DRAM log area 205 is also referred to in addition to the master table 204.

When data update becomes stable, i.e., when management information and data are consistent with each other (when management information managed by the master table 204, the DRAM log area 205, and the like and a status of data in the NAND memory 10 are consistent with each other), a log is committed. In the commit processing, a content of a log of the type A in the DRAM log area 205 is reflected in the master table 204, and, furthermore, the whole content (type A and type B) of the DRAM log area 205 is stored in the NAND memory 10 to make it nonvolatile. A snapshot is stored in the NAND memory 10 on occasions such as in a normal power-off sequence and when a storage area of the NAND log 203 becomes insufficient. Therefore, normally, an execution interval of the commit processing is shorter than that of storing processing of a snapshot. At the time when writing of a log or a snapshot in the NAND memory 10 is finished, the processing of making the management table nonvolatile is completed. After a snapshot is taken or the commit processing is performed, a log accumulated on the DRAM log area 205 is invalidated.

The type A is employed for management information that wants to be enabled to return to a state at a certain past point by invalidating a log accumulated on the DRAM 20, and the type B is employed for management information of which state does not need to be returned. For example, the type A is used for management information that is used in the logical layer managing unit 120c, and the type B is used for management information that is used in the physical layer managing unit 120d. The physical layer managing unit 120d manages a physical state (error occurrence, and the like) of the NAND memory 10, so that a state need not be returned. On the other hand, the logical layer managing unit 120c manages data with a virtual logical block as described above. Therefore, for example, if an error occurs in a logical block when writing data in the logical block, the data may need to be written in a different logical block after cancelling the write processing in the logical block in which the error occurred. In such case, the state needs to be returned. An error in a logical block is managed in the physical layer managing unit 120d. A log that records update difference information includes a difference log as a copy of a change difference of a management table and an event log (of which data size is smaller than that of the difference log) that records occurrence of an event. The difference log is often used as a log of the type A used in the logical layer managing unit 120c, and the event log is often used as a log of the type B used in the physical layer managing unit 120d.

In the SSD 100, even when a size of write data from the host 1 is large, the write data is divided by the ATA-command processing unit 121 into a predetermined size or less for writing, so that an upper limit number of a log to be accumulated in the DRAM log area 205 can be estimated for a log of the type A. However, because a log of the type B manages a physical phenomenon such as occurrence of an error, the upper limit is difficult to determine. For example, when a bad block BB is generated, it is difficult to predict the upper limit of the number of bad blocks to be generated. Therefore, the DRAM log area 205 may overflow due to a log (event log) that records generation of a bad block BB. If the DRAM log area 205 can secure sufficient storage capacity, the overflowing of the DRAM log area 205 can be prevented. However, this runs counter to the demand of reducing a storage capacity of a nonvolatile memory storing a log by reducing an amount of log to be accumulated.

Thus, in the present embodiment, in addition to the above conditions for storing a snapshot explained with reference to FIG. 5, i.e., in a normal power-off sequence and when a storage area of the NAND log 203 becomes insufficient, a new condition for storing a snapshot is added. Specifically, if a remaining amount in the DRAM log area 205 is small at the time of accumulating a log of the type B in the DRAM log area 205, i.e., at the time of detecting overflowing of the log of the type B (at the time when an accumulation amount of the log of the type B exceeds a preset upper limit value), it is stopped to keep the log of the type B in the DRAM log area 205. When a condition for performing the commit processing is satisfied next time, the snapshot processing of storing the master table 204 in the NAND memory 10 as a snapshot 202 is performed, and the commit processing of storing an accumulated log of the type A and the type B of the DRAM log area 205 in the NAND memory 10 as the NAND log 203 is not performed.

Figure 6:
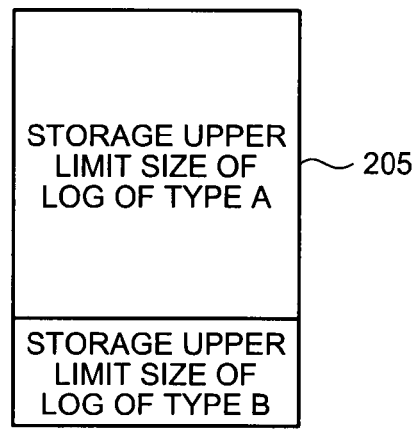
FIG. 6 is a schematic diagram of a storage upper limit size of a DRAM log area.

For a log of the type B, the master table 204 is updated at the timing of recording the log in the DRAM log area 205, so that when overflowing of the log of the type B is detected, even if a subsequent log of the type B is discarded, management information concerning the type B can be restored in spite of occurrence of an incorrect power-off by taking a snapshot of the master table 204 at the timing of the next commit processing. As described above, the upper limit size of a log of the type A is determined. Therefore, if the upper limit size of a log of the type B is determined, a size of the DRAM log area 205 can be determined by figuring out the sum of the both sizes. FIG. 6 is a schematic diagram illustrating storage upper limit sizes of logs of the type A and the type B.

FIG. 4 is a functional block diagram of the data managing unit 120 performing the above described control. The data managing unit (controller) 120 includes a read/write control unit 210, a snapshot transferring unit 211, a log recording unit 212, a log reflecting unit 213, a snapshot storing unit 214, and a log overflow control unit 215.

The read/write control unit 210 performs the above-described read/write control on the NAND memory 10 via the cache memory 206 based on the master table 204 and a log accumulated in the DRAM log area 205. The snapshot transferring unit 211 loads the NAND management table (snapshot) 202 including a type A management table for managing management information of the type A and a type B management table for managing management information of the type B stored in the NAND memory 10 onto the DRAM 20 as the master table 204 at the time of start-up.

When an event occurs so that the type A management table in the master table 204 needs to be updated, the log recording unit 212 accumulates and stores a log of the type A as difference information of the type A management table in the DRAM log area 205. Moreover, when an event occurs so that the type B management table in the master table 204 needs to be updated, the log recording unit 212 accumulates and stores a log of the type B as difference information of the type B management table in the DRAM log area 205 and updates the type B management table in the master table 204.

When the above described commit performing condition is satisfied, the log reflecting unit 213 stores logs of the types A and B accumulated in the DRAM log area 205 in the NAND memory 10 as the NAND log 203 and reflects a content of the log of the type A in the type A management table in the master table 204.

When the above described snapshot performing condition is satisfied, the snapshot storing unit 214 stores the type A management table and the type B management table in the master table 204 in the NAND memory 10 as the snapshot 202.

Figure 7:
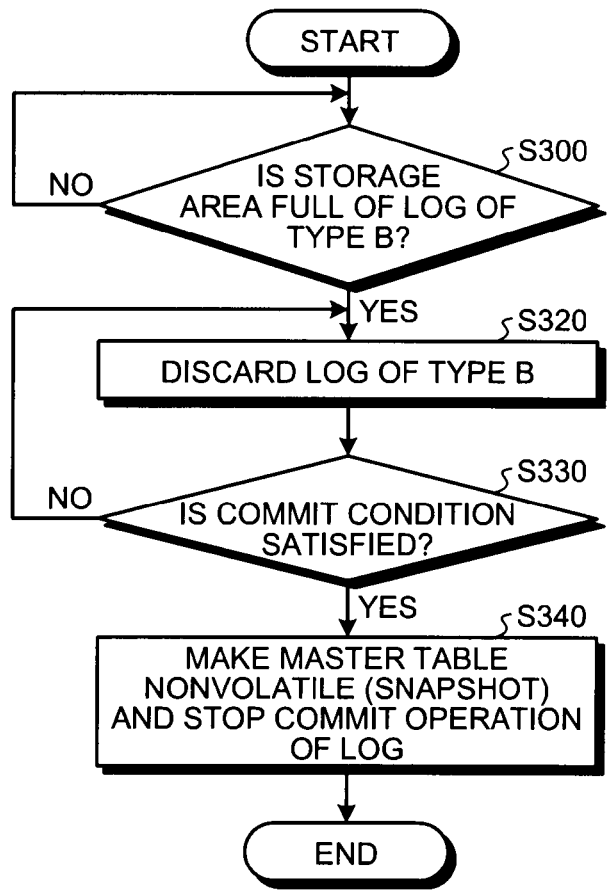
FIG. 7 is a flowchart of an operation example according to the first embodiment of the present invention.

The log overflow control unit 215 is a relevant functional configuration unit of the present embodiment, of which processing content is explained with reference to FIG. 7. When a log overflow occurs, i.e., a log of the type B accumulated and recorded in the DRAM log area 205 exceeds a predetermined upper limit size (Step S300), the log overflow control unit 215 stops the operation of the log recording unit 212 to record the log of the type B to the DRAM log area 205 (update operation for the type B management table in the master table 204 is performed), and a subsequent log of the type B is discarded. Then, when the next commit performing condition is satisfied (Step S330), the commit operation by the log reflecting unit 213 is prohibited and the snapshot storing operation by the snapshot storing unit 214 is performed (Step S340).

Figure 8:
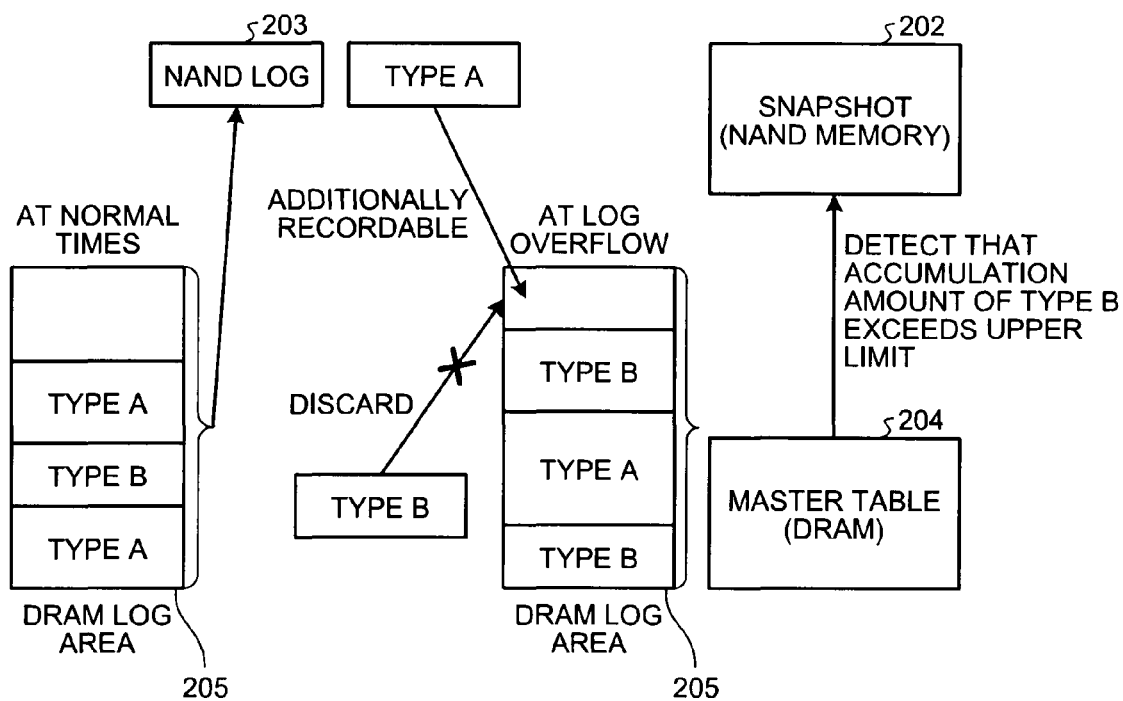
FIG. 8 is a schematic diagram of an operation when a log overflows.

FIG. 8 is a schematic diagram of operation examples in the normal operation and when a log of the type B overflows. In the normal operation, when an event occurs so that the type A management table or the type B management table in the master table 204 needs to be updated, the log recording unit 212 accumulates and stores a log of the type A or the type B in the DRAM log area 205. Then, when the commit performing condition is satisfied, the log reflecting unit 213 stores the logs of the type A and the type B accumulated in the DRAM log area 205 in the NAND memory 10 as the NAND log 203.

On the other hand, when a log overflow occurs, i.e., a log of the type B accumulated and recorded in the DRAM log area 205 exceeds the predetermined upper limit size, the log overflow control unit 215 stops the recording operation of the log of the type B in the DRAM log area 205 and performs the update operation for the type B management table in the master table 204. Consequently, only a log of the type A can be accumulated in the DRAM log area 205 and a log of the type B is discarded thereafter. When the next commit performing condition is satisfied (Step S330), the log overflow control unit 215 prohibits the commit operation and causes the snapshot storing unit 214 to perform the snapshot storing operation.

According to the first embodiment, when a log of the type B overflow in the DRAM log area 205, only a log of the type A is accumulated in the DRAM log area 205 thereafter. For management information of the type B, the master table 204 is updated. When the next commit performing condition is satisfied, a snapshot is taken without performing the commit operation. Therefore, it is not necessary to secure sufficient size for the DRAM log area 205, so that a size of a capacity of the DRAM log area 205 can be reduced. Thus, a log of the type B is not written in an area for a log of the type A and a consistency of management information can be maintained even in an incorrect power-off.

A method can be considered to update the master table 204 and take a snapshot in the NAND memory 10 every time an error occurs such as a bad block BB, which however, increases the number of times of taking a snapshot. Thus, the number of times of writing in the NAND memory 10 and a write amount increase.

(Second Embodiment)

Figure 9:
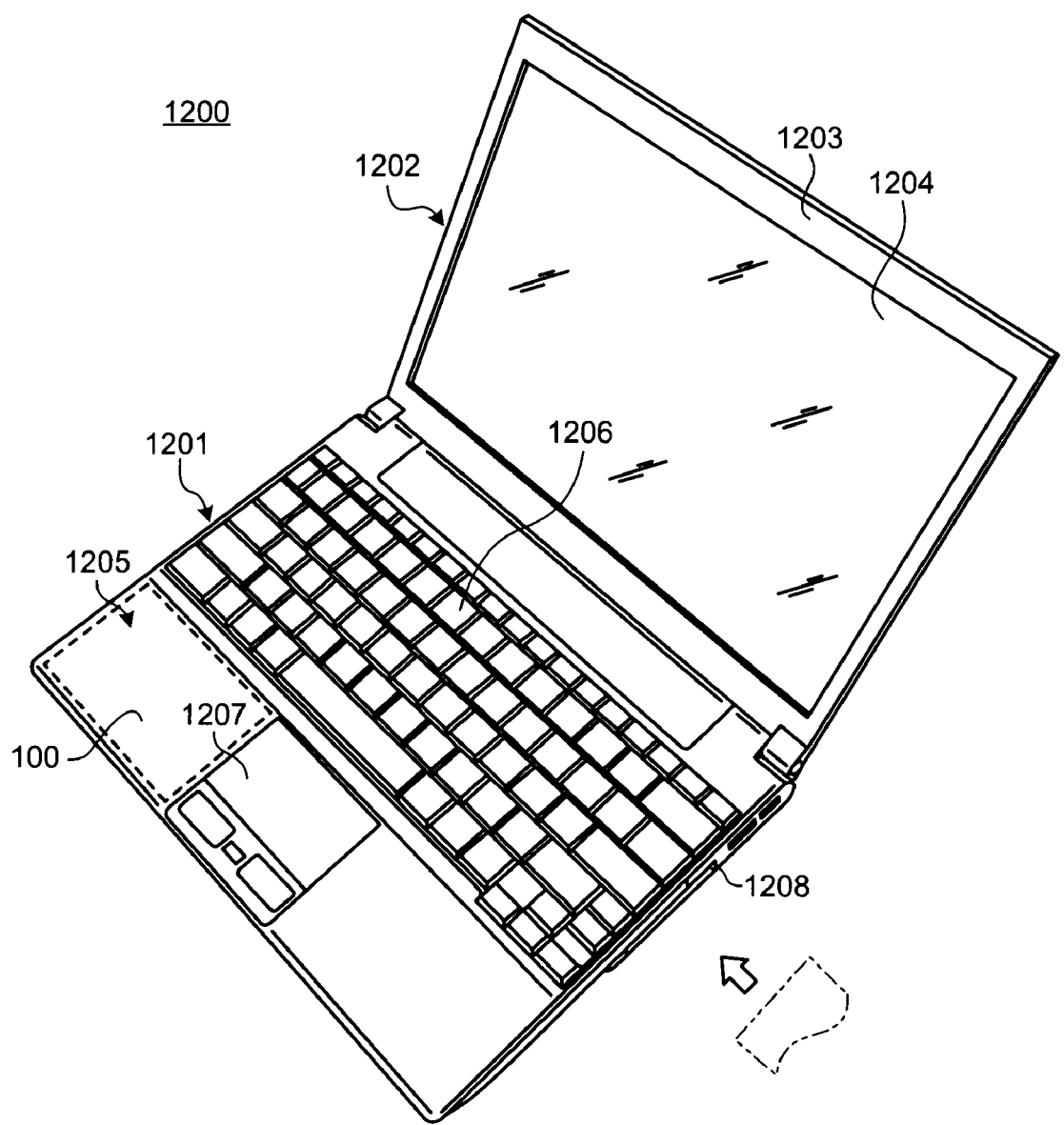
FIG. 9 is a perspective view of a PC on which the SSD is mounted.

FIG. 9 is a perspective view of an example of a PC 1200 on which the SSD 100 is mounted. The PC 1200 includes a main body 1201 and a display unit 1202. The display unit 1202 includes a display housing 1203 and a display device 1204 accommodated in the display housing 1203.

The main body 1201 includes a chassis 1205, a keyboard 1206, and a touch pad 1207 as a pointing device. The chassis 1205 includes a main circuit board, an optical disk device (ODD) unit, a card slot, and the SSD 100.

The card slot is provided so as to be adjacent to the peripheral wall of the chassis 1205. The peripheral wall has an opening 1208 facing the card slot. A user can insert and remove an additional device into and from the card slot from outside the chassis 1205 through the opening 1208

The SSD 100 can be used instead of a conventional hard disk drive (HDD) in the state of being mounted on the PC 1200 or can be used as an additional device in the state of being inserted into the card slot.

Figure 10:
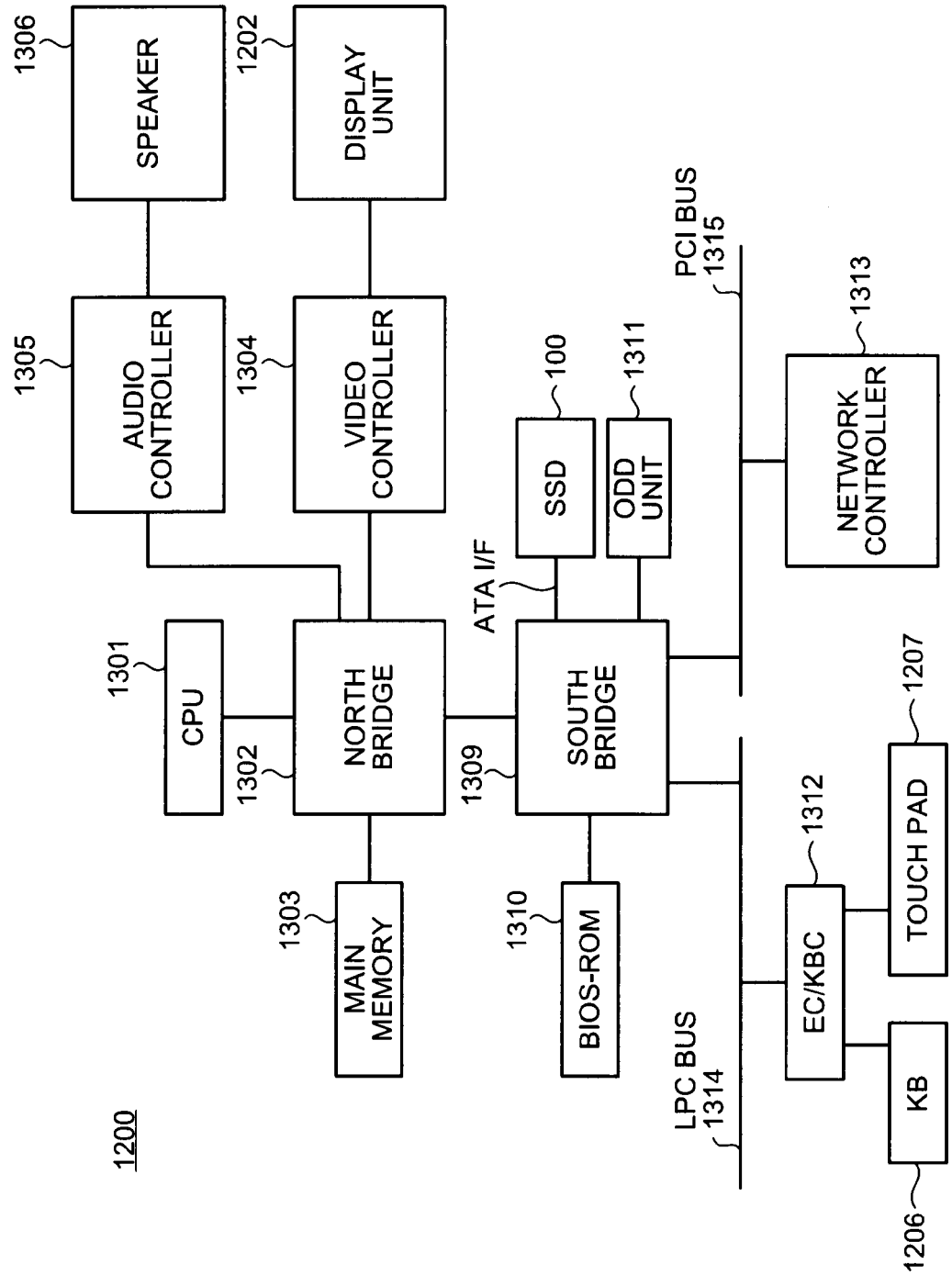
FIG. 10 is a schematic diagram of a system configuration example of the PC on which the SSD is mounted.

FIG. 10 is a schematic diagram of a system configuration example of the PC 1200 on which the SSD 100 is mounted. The PC 1200 includes a CPU 1301, a north bridge 1302, a main memory 1303, a video controller 1304, an audio controller 1305, a south bridge 1309, a basic input/output system read-only memory (BIOS-ROM) 1310, the SSD 100, an ODD unit 1311, an embedded controller/keyboard controller IC (EC/KBC) 1312, and a network controller 1313.

The CPU 1301 is a processor for controlling an operation of the PC 1200, and executes an operating system (OS) loaded from the SSD 100 onto the main memory 1303. Furthermore, when the ODD unit 1311 is capable of executing at least one of read processing and write processing on a mounted optical disk, the CPU 1301 executes the processing.

Moreover, the CPU 1301 executes a system BIOS stored in the BIOS-ROM 1310. The system BIOS is a computer program for controlling a hardware of the PC 1200.

The north bridge 1302 is a bridge device that connects a local bus of the CPU 1301 to the south bridge 1309. The north bridge 1302 has a memory controller for controlling an access to the main memory 1303.

Moreover, the north bridge 1302 has a function of executing a communication with the video controller 1304 and a communication with the audio controller 1305 through an accelerated graphics port (AGP) bus and the like.

The main memory 1303 temporarily stores therein a computer program and data, and functions as a work area of the CPU 1301. The main memory 1303, for example, consists of a DRAM.

The video controller 1304 is a video reproduction controller for controlling the display unit 1202 used as a display monitor of the PC 1200.

The audio controller 1305 is an audio reproduction controller for controlling a speaker 1306 of the PC 1200.

The south bridge 1309 controls each device on a low pin count (LPC) bus 1314 and each device on a peripheral component interconnect (PCI) bus 1315. Moreover, the south bridge 1309 controls the SSD 100 that is a memory device storing various types of software and data through the ATA interface.

The PC 1200 accesses the SSD 100 in sector units. A write command, a read command, a flush command, and the like are input to the SSD 100 through the ATA interface.

The south bridge 1309 has a function of controlling an access to the BIOS-ROM 1310 and the ODD unit 1311.

The EC/KBC 1312 is a one-chip microcomputer in which an embedded controller for power management and a keyboard controller for controlling the keyboard 1206 and the touch pad 1207 are integrated.

The EC/KBC 1312 has a function of turning on/off the PC 1200 based on an operation of a power button by a user. The network controller 1313 is, for example, a communication device that executes communication with an external network such as the Internet.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A memory system comprising:
a nonvolatile memory being capable of storing a first snapshot, a second snapshot, a first log and a second log;
a volatile memory being capable of storing a first management table and a second management table for managing data in the nonvolatile memory; and
a controller configured to perform data transfer between the nonvolatile memory and the volatile memory, wherein
the controller includes:
   a snapshot transferring unit configured to load the first snapshot stored in the nonvolatile memory onto the volatile memory as the first management table and the second management table;
   a log recording unit configured,
      when an event occurs so that the first management table needs to be updated, to record update information of the first management table in a log storage area of the volatile memory as the first log and not to update the first management table, and
      when an event occurs so that the second management table needs to be updated, to record update information of the second management table in the log storage area as the second log and update the second management table;
   a log reflecting unit configured to, when a first condition is satisfied, perform a commit operation for saving the first log and the second log recorded in the log storage area into the nonvolatile memory and incorporating a content of the first log into the first management table;
   a snapshot storing unit configured to, when a second condition is satisfied, perform a snapshot storing operation for saving the first management table and the second management table into the nonvolatile memory as the second snapshot and invalidate the first snapshot; and
   a log overflow control unit configured,
      when a third condition is satisfied, to prohibit the recording operation of the second log and to cause the log recording unit only to perform the updating operation of the second management table, and
      when the first condition is satisfied after the third condition has been satisfied, to prohibit the commit operation by the log reflecting unit and to cause the snapshot storing unit to perform the snapshot storing operation.

2. The memory system according to claim 1, wherein
the log reflecting unit is configured to invalidate the first log and the second log recorded in the log storage area of the volatile memory after performing the commit operation, and
the snapshot storing unit is configured to invalidate the first log and the second log saved in the nonvolatile memory after performing the snapshot storing operation.

3. The memory system according to claim 2, wherein the first condition includes a case in which management information managed by the first and second management tables and by the first and second logs recorded in the volatile memory and a status of data in the nonvolatile memory are consistent with each other.

4. The memory system according to claim 2, wherein the second condition includes at least one of a case in which a normal power-off sequence occurs and a case in which an amount of the first log and the second log stored in the volatile memory exceeds a predetermined threshold.

5. The memory system according to claim 2, wherein the log recording unit is configured to invalidate the first log recorded in the log storage area in order to return to a state at a certain past point represented by the first management table.

6. The memory system according to claim 1, wherein the first condition includes a case in which management information managed by the first and second management tables and by the first and second logs recorded in the volatile memory and a status of data in the nonvolatile memory are consistent with each other.

7. The memory system according to claim 6, wherein the second condition includes at least one of a case in which a normal power-off sequence occurs and a case in which an amount of the first log and the second log stored in the volatile memory exceeds a predetermined threshold.

8. The memory system according to claim 6, wherein the log recording unit is configured to invalidate the first log recorded in the log storage area in order to return to a state at a certain past point represented by the first management table.

9. The memory system according to claim 8, wherein
the nonvolatile memory includes a plurality of blocks, each one of the plurality of blocks is a unit of data erasing and includes a plurality of pages, each one of the plurality of pages is a unit of data programming,
the controller includes:
   a logical layer management unit configured to manage a correspondence between logical addresses provided by the host apparatus and logical block that is associated with at least one physical block by the first management table; and
   a physical layer management unit configured to manage a bad block in the nonvolatile memory and a correspondence between the logical block and the at least one physical block by the second management table.

10. The memory system according to claim 9, wherein
the first log includes a difference log that is obtained by copying a difference between before and after update of the first management table, and
the second log includes an event log that records occurrence of an event concerning the second management table.

11. The memory system according to claim 1, wherein the second condition includes at least one of a case in which a normal power-off sequence occurs and a case in which an amount of the first log and the second log stored in the nonvolatile memory exceeds a predetermined threshold.

12. The memory system according to claim 1, wherein the log recording unit is configured to invalidate the first log recorded in the log storage area in order to return to a state at a certain past point represented by the first management table.

13. The memory system according to claim 1, wherein the nonvolatile memory is configured in a NAND flash memory.

14. A method of controlling a memory system which includes a nonvolatile memory being capable of storing a first snapshot, a second snapshot, a first log and a second log, and a volatile memory being capable of storing a first management table and a second management table for managing data in the nonvolatile memory, the method comprising:

performing data transfer between the nonvolatile memory and the volatile memory;

loading the first snapshot stored in the nonvolatile memory onto the volatile memory as the first management table and the second management table;

recording, when an event occurs so that the first management table needs to be updated, update information of the first management table in a log storage area of the volatile memory as the first log and not updating the first management table, recording, when an event occurs so that the second management table needs to be updated, update information of the second management table in the log storage area as the second log and updating the second management table;

performing, when a first condition is satisfied, a commit operation for saving the first log and the second log recorded in the log storage area into the nonvolatile memory and incorporating a content of the first log into the first management table;

performing, when a second condition is satisfied, a snapshot storing operation for saving the first management table and the second management table into the nonvolatile memory as the second snapshot and invalidating the first snapshot;

prohibiting, when a third condition is satisfied, the recording operation of the second log and only performing the updating operation of the second management table, and prohibiting, when the first condition is satisfied after the third condition has been satisfied, the commit operation and performing the snapshot storing operation.

15. The method according to claim 14, further comprising:
invalidating the first log and the second log recorded in the log storage area of the volatile memory after performing the commit operation, and
invalidating the first log and the second log saved in the nonvolatile memory after performing the snapshot storing operation.

16. The method according to claim 15, wherein the first condition includes a case in which management information managed by the first and second management tables and by the first and second logs recorded in the volatile memory and a status of data in the nonvolatile memory are consistent with each other.

17. The method according to claim 15, wherein the second condition includes at least one of a case in which a normal power-off sequence occurs and a case in which an amount of the first log and the second log stored in the volatile memory exceeds a predetermined threshold.

18. The method according to claim 15, further comprising:
invalidating the first log recorded in the log storage area in order to return to a state at a certain past point represented by the first management table.

19. The method according to claim 14, wherein the first condition includes a case in which management information managed by the first and second management tables and by the first and second logs recorded in the volatile memory and a status of data in the nonvolatile memory are consistent with each other.

20. The method according to claim 19, wherein the second condition includes at least one of a case in which a normal power-off sequence occurs and a case in which an amount of the first log and the second log stored in the volatile memory exceeds a predetermined threshold.

21. The method according to claim 19, further comprising:
invalidating the first log recorded in the log storage area in order to return to a state at a certain past point represented by the first management table.

22. The method according to claim 21, wherein
the nonvolatile memory includes a plurality of blocks, each one of the plurality of blocks is a unit of data erasing and includes a plurality of pages, each one of the plurality of pages is a unit of data programming, further comprising:
managing a correspondence between logical addresses provided by the host apparatus and a logical block that is associated with at least one physical block by the first management table; and
managing a bad block in the nonvolatile memory and a correspondence between the logical block and the at least one physical block by the second management table.

23. The method according to claim 22, wherein
the first log includes a difference log that is obtained by copying a difference between before and after update of the first management table, and
the second log includes an event log that records occurrence of an event concerning the second management table.

24. The method according to claim 14, wherein the second condition includes at least one of a case in which a normal power-off sequence occurs and a case in which an amount of the first log and the second log stored in the nonvolatile memory exceeds a predetermined threshold.

25. The method according to claim 14, further comprising:
invalidating the first log recorded in the log storage area in order to return to a state at a certain past point represented by the first management table.

26. The method according to claim 14, wherein the nonvolatile memory is configured in a NAND flash memory.

* * * * *